United States Patent
Tsai et al.

(10) Patent No.: US 11,394,953 B2
(45) Date of Patent: Jul. 19, 2022

(54) LIGHT TRANSMITTING DISPLAY SYSTEM, IMAGE OUTPUT METHOD THEREOF AND PROCESSING DEVICE THEREOF

(71) Applicant: INDUSTRIAL TECHNOLOGY RESEARCH INSTITUTE, Hsinchu (TW)

(72) Inventors: Yi-Shou Tsai, Hsinchu (TW); Shin-Hong Kuo, New Taipei (TW); Kuan-Ting Chen, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/197,412

(22) Filed: Mar. 10, 2021

(65) Prior Publication Data
US 2022/0030216 A1    Jan. 27, 2022

(30) Foreign Application Priority Data

Jul. 22, 2020   (TW) ................................ 109124730

(51) Int. Cl.
*H04N 13/344* (2018.01)
*H04N 13/111* (2018.01)
(Continued)

(52) U.S. Cl.
CPC ......... *H04N 13/344* (2018.05); *H04N 13/111* (2018.05); *H04N 13/122* (2018.05); *H04N 13/371* (2018.05); *H04N 13/383* (2018.05)

(58) Field of Classification Search
CPC .. H04N 13/111; H04N 13/122; H04N 13/341; H04N 13/344; H04N 13/371; H04N 13/383
See application file for complete search history.

(56) References Cited

U.S. PATENT DOCUMENTS 6,843,563 B2   1/2005   Richardson
9,877,016 B2*  1/2018   Esteban ............... H04N 13/296
(Continued)

FOREIGN PATENT DOCUMENTS

CN   104883556 A   9/2015
CN   105719586 A   6/2016
(Continued)

OTHER PUBLICATIONS

Taiwanese Office Action and Search Report for Taiwanese Application No. 109124730, dated Aug. 9, 2021.

*Primary Examiner* — Dmitriy Bolotin
(74) *Attorney, Agent, or Firm* — Birch, Stewart, Kolasch & Birch, LLP

(57) ABSTRACT

A light transmitting display system, an image output method thereof and a processing device thereof are provided. The light transmitting display device is located between a background object and a user. The image output method includes the following steps. The locations of the user, the light transmitting display device and the background object are detected. A coordinate conversion relationship between the user, the light transmitting display device and the background object is established. An eyes midpoint and an eyes offset of the user are detected. A left eye viewpoint and a right eye viewpoint of the user on the light transmitting display device are calculated according to the coordinate conversion relationship, the eyes midpoint and the eyes offset of the user. As a head-mounted device is switched, an image is alternately displayed at the left eye viewpoint and the right eye viewpoint.

20 Claims, 15 Drawing Sheets

(51) Int. Cl.
    *H04N 13/383*    (2018.01)
    *H04N 13/371*    (2018.01)
    *H04N 13/122*    (2018.01)

(56) References Cited

U.S. PATENT DOCUMENTS

| | | | |
|---|---|---|---|
| 2014/0049620 A1* | 2/2014 | Sun | H04N 13/366 |
| | | | 348/51 |
| 2018/0102077 A1* | 4/2018 | Lin | H04N 13/363 |
| 2019/0158809 A1* | 5/2019 | Sasaki | H04N 13/376 |
| 2019/0180514 A1* | 6/2019 | Sasaki | H04N 13/128 |
| 2019/0285895 A1* | 9/2019 | Fujimaki | G02B 27/0172 |
| 2022/0030216 A1* | 1/2022 | Tsai | H04N 13/341 |
| 2022/0078419 A1* | 3/2022 | Kanoh | H04N 19/117 |

FOREIGN PATENT DOCUMENTS

| | | |
|---|---|---|
| TW | 201408352 A | 3/2014 |
| TW | I429275 B | 3/2014 |
| TW | I509289 B | 11/2015 |

\* cited by examiner

LIGHT TRANSMITTING DISPLAY SYSTEM, IMAGE OUTPUT METHOD THEREOF AND PROCESSING DEVICE THEREOF

This application claims the benefit of Taiwan application Serial No. 109124730, filed Jul. 22, 2020, the disclosure of which is incorporated by reference herein in its entirety.

TECHNICAL FIELD

The disclosure relates in general to a light transmitting display system, an image output method thereof and a processing device thereof.

BACKGROUND

Along with the advance in the display technology, various display devices are provided one after another. Referring to FIG. 1, a schematic diagram of a light transmitting display device 910 is shown. The light transmitting display device 910 is located between a user 970 and a background object 960 and displays an image P70. When the user 970 stands in front of the light transmitting display device 910, the image P70 overlaps with an image P80 of the background object 960.

However, parallax exists between human's two eyes. Refer to FIGS. 2 to 3. FIG. 2 is an overlap viewed by the right eye of a particular user 970 (the left eye is closed). FIG. 3 is an overlap viewed by the left eye of the user 970 (the right eye is closed). At the same position, the image P70 viewed by the right eye of the user 970 is exactly aligned with the center of the image P80, but the image P70 viewed by the left eye of the user 970 is biased to the right of the image P80. This phenomenon is referred as parallax.

If the alignment of the image P70 is based on FIG. 2, the left eye will have burden. If the image P70 is slightly shifted to the left so that the burden of the left eye can be reduced, burden will fall on the right eye. Therefore, the research personnel are devoted to providing an image output method of a light transmitting display system to set the left eye and the right eye of the user 970 free of parallax.

SUMMARY

The disclosure is related to a light transmitting display system, an image output method thereof and a processing device thereof.

According to one embodiment, an image output method of a light transmitting display system is provided. The light transmitting display device is located between a background object and a user. The image output method includes the following steps. Locations of the user, the light transmitting display device and the background object are detected. A coordinate conversion relationship among the user, the light transmitting display device and the background object is established. An eyes midpoint and an eyes offset of the user are detected. A left eye viewpoint and a right eye viewpoint of the user on the light transmitting display device are calculated according to the coordinate conversion relationship, the eyes midpoint and the eyes offset of the user. As a head-mounted device is switched, an image is alternately displayed at the left eye viewpoint and the right eye viewpoint.

According to another embodiment, a light transmitting display system is provided. The light transmitting display system includes a light transmitting display device, an image detection device, a head-mounted device and a processing device. The light transmitting display device is located between a background object and a user. The image detection device is configured to detect locations of the user, the light transmitting display device and the background object, an eyes midpoint and an eyes offset of the user. The processing device includes a coordinate conversion relationship establishment unit, a viewpoint calculation unit and an image control unit. The coordinate conversion relationship establishment unit is configured to establish a coordinate conversion relationship among the user, the light transmitting display device and the background object. The viewpoint calculation unit is configured to calculate a left eye viewpoint and a right eye viewpoint of the user on the light transmitting display device according to the coordinate conversion relationship, the eyes midpoint and the eyes offset of the user. The image control unit is configured to control the light transmitting display device to alternately display the image at the left eye viewpoint and the right eye viewpoint as the head-mounted device is switched.

According to an alternative embodiment, a processing device is provided. The processing device is configured to control the light transmitting display system. The light transmitting display system includes a light transmitting display device, an image detection device and a head-mounted device. The light transmitting display device is located between a background object and a user. The image detection device is configured to detect locations of the user, the light transmitting display device and the background object, an eyes midpoint and an eyes offset of the user. The processing device includes a coordinate conversion relationship establishment unit, a viewpoint calculation unit and an image control unit. The coordinate conversion relationship establishment unit is configured to establish a coordinate conversion relationship among the user, the light transmitting display device and the background object. The viewpoint calculation unit is configured to calculate a left eye viewpoint and a right eye viewpoint of the user on the light transmitting display device according to the coordinate conversion relationship, the eyes midpoint and the eyes offset of the user. The image control unit is configured to control the light transmitting display device to alternately display the image at the left eye viewpoint and the right eye viewpoint as the head-mounted device is switched.

The above and other aspects of the invention will become better understood with regard to the following detailed description of the embodiment(s). The following description is made with reference to the accompanying drawings.

Figure 1:
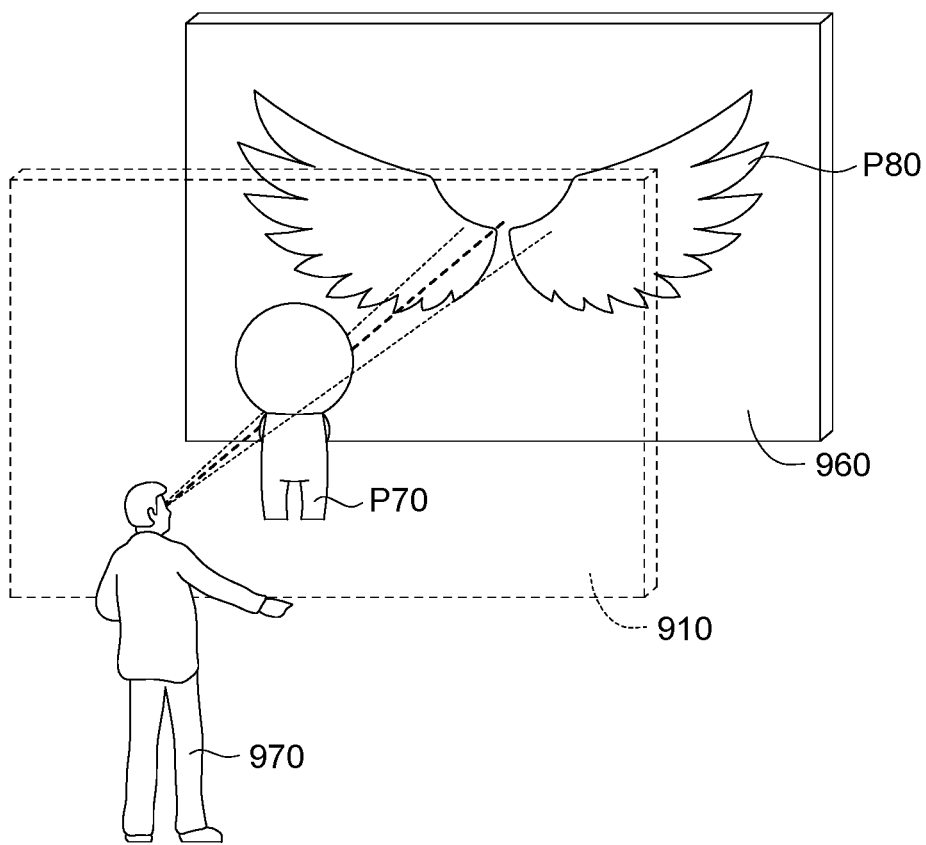
FIG. 1 (Prior art) is a schematic diagram of a light transmitting display device.
Figure 2:
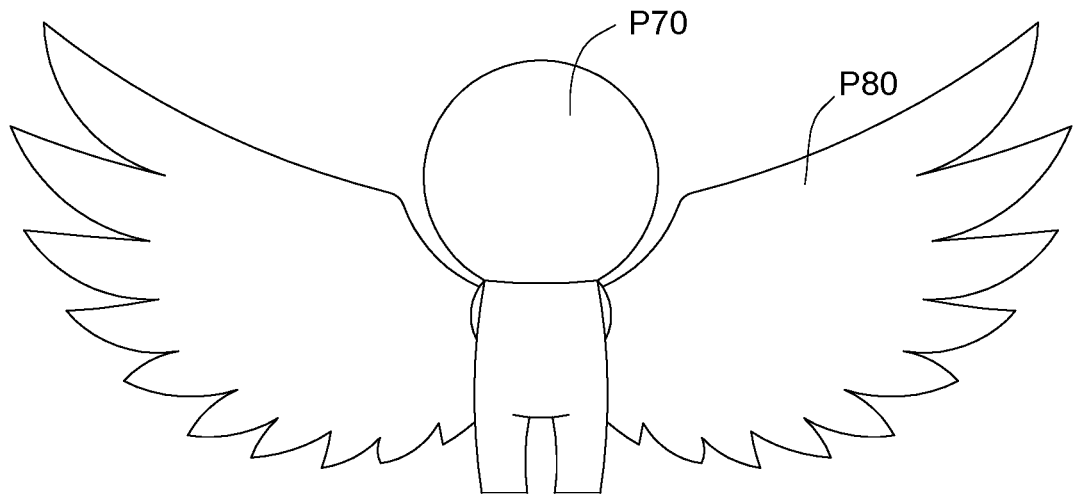
FIG. 2 (Prior art) is an overlap viewed by the right eye of a particular user (the left eye is closed)
Figure 3:
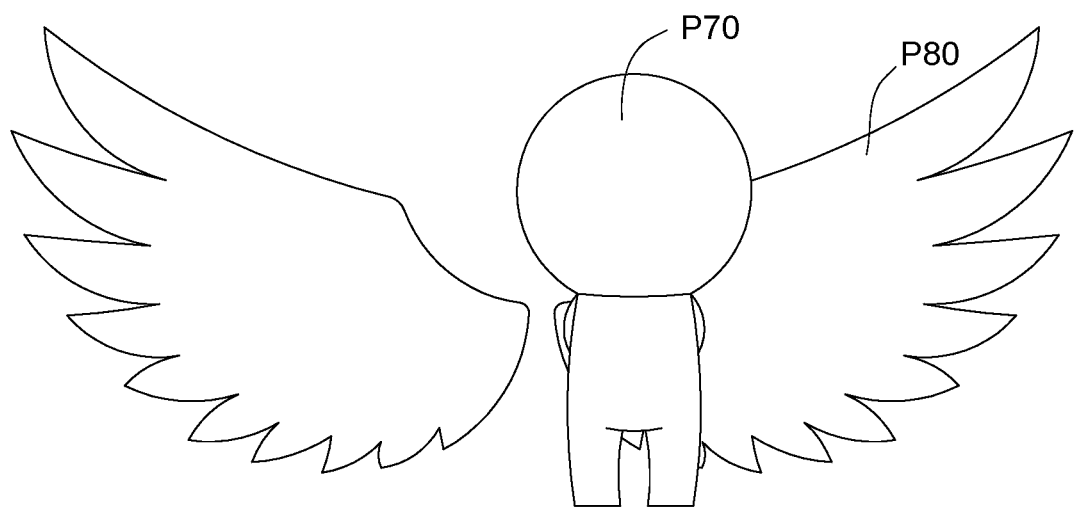
FIG. 3 (Prior art) is an overlap viewed by the left eye of the user with (the right eye is closed)

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawing.

DETAILED DESCRIPTION

Figure 4A:
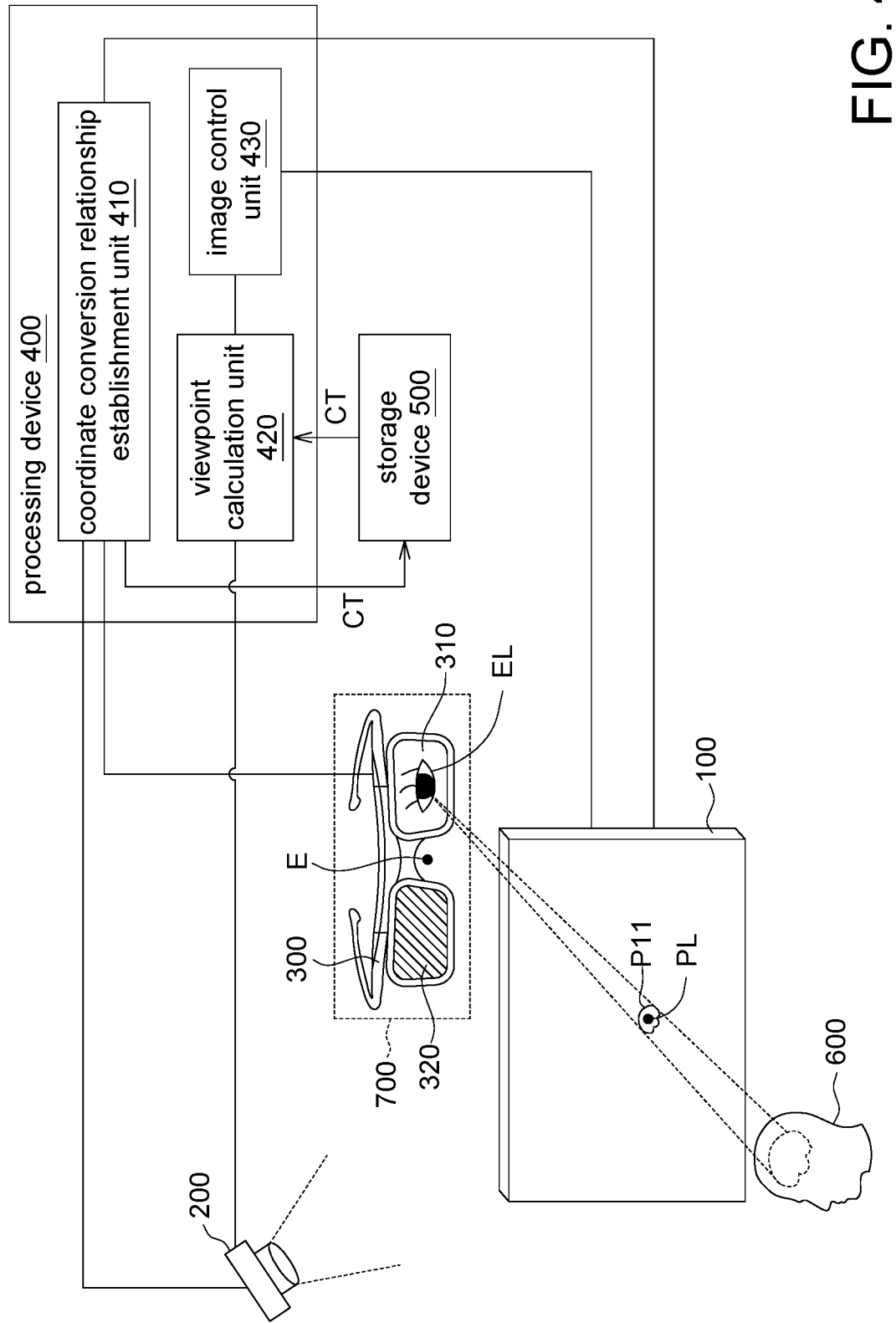
FIGS. 4A to 4B are schematic diagram of a light transmitting display system according to an embodiment.
Figure 4B:
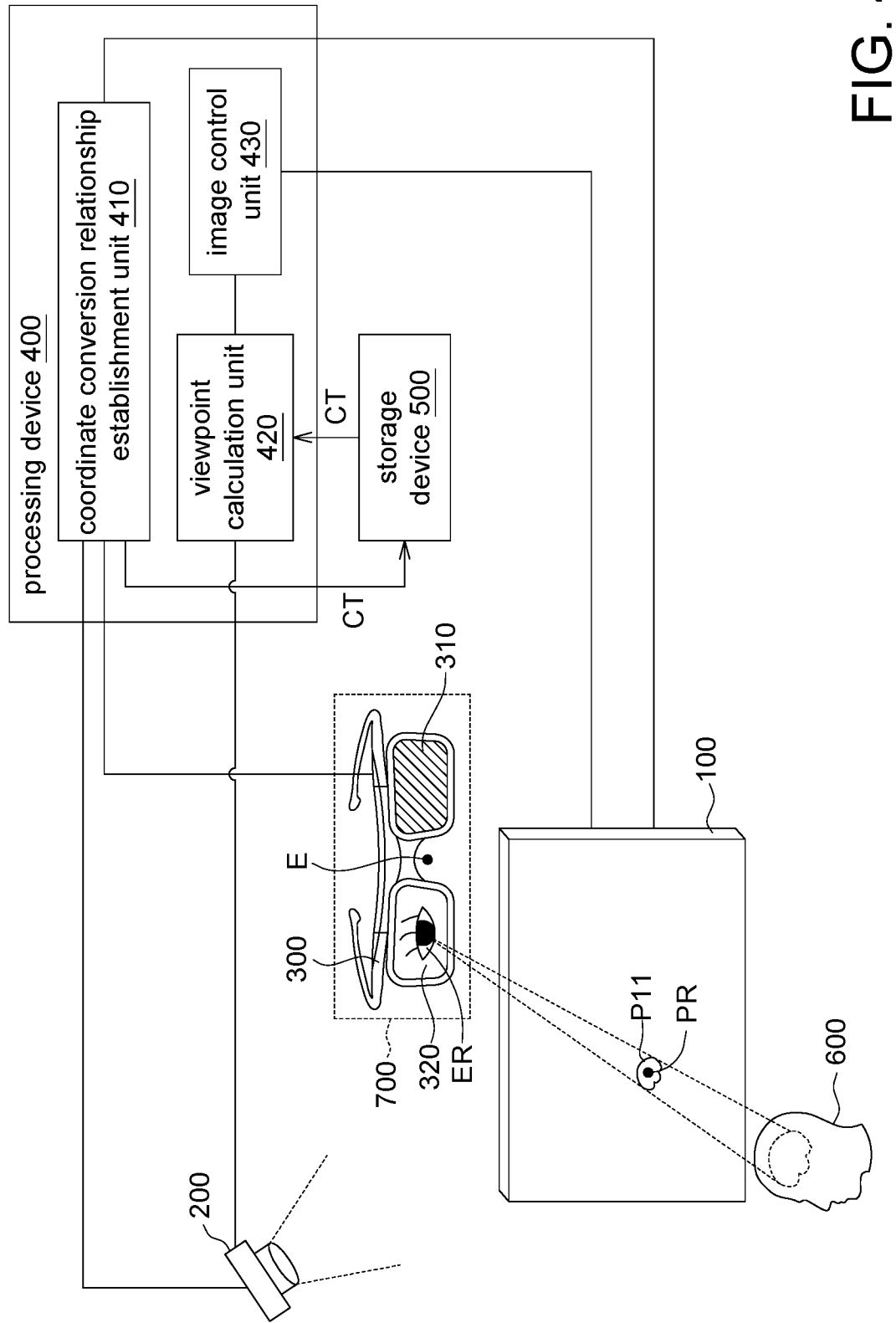

Referring to FIGS. 4A to 4B, schematic diagrams of a light transmitting display system 1000 according to an embodiment are shown. The light transmitting display system 1000 includes a light transmitting display device 100, an image detection device 200, a head-mounted device 300 and a processing device 400. The light transmitting display device 100 is located between a background object 600 and a user 700 and can be used in the teaching field. The background object 600 can be realized by an image of a human body. The light transmitting display device 100 can be realized by a light transmitting liquid crystal display (light transmitting LCD), a light transmitting organic light emitting diode display (light transmitting OLED display) or a light transmitting glass attached with a reflective film. The image detection device 200 is configured to detect an image. The image detection device 200 can be realized by an image detection device, a camera or an infrared sensor. The head-mounted device 300 has a shutter configured to alternately block the left eye and the right eye, such that the left eye and the right eye can be alternately used to view the image. The processing device 400 is configured to execute various analysis programs, calculation programs or control programs. The processing device 400 can be realized by a computer, a server, a cloud computing center or a mobile phone. In an embodiment, the light transmitting display system 1000 further includes a storage device 500 configured to store data. The storage device 500 can be realized by a hard disc, a memory, an optical disc or a cloud storage center.

The processing device 400 includes a coordinate conversion relationship establishment unit 410, a viewpoint calculation unit 420 and an image control unit 430. The coordinate conversion relationship establishment unit 410 is configured to establish a coordinate conversion relationship CT. The viewpoint calculation unit 420 is configured to calculate a point coordinate using the coordinate conversion relationship CT. The image control unit 430 is configured to execute a control program of the light transmitting display device 100 to display a needed image. The coordinate conversion relationship establishment unit 410, the viewpoint calculation unit 420 and the image control unit 430 can be realized by a circuit, a circuit board or a memory device storing programming codes.

As indicated in FIG. 4A, the head-mounted device 300 allows the left eye window 310 to be light transmitting but allows the right eye window 320 to be opaque, and the user 700 views the light transmitting display device 100 and the image P11 with his/her left eye EL. Meanwhile, with respect to the sight of the left eye EL, the image P11 is displayed at a left eye viewpoint PL, such that the image P11 viewed by the left eye EL of the user 700 can be aligned with the background object 600.

As indicated in FIG. 4B, the head-mounted device 300 allows the left eye window 310 to be opaque but allows the right eye window 320 to be light transmitting, and the user 700 views the light transmitting display device 100 and the image P11 his/her the right eye ER. Meanwhile, with respect to the sight of the right eye ER, the image P11 is displayed at a right eye viewpoint PR, such that the image P11 viewed by the right eye ER of the user 700 can be aligned with the background object 600.

As the head-mounted device 300 is switched, the processing device 400 controls the light transmitting display device 100 to alternately display the image P11 at the left eye viewpoint PL and the right eye viewpoint PR. Thus, when viewing the light transmitting display device 100, the left eye EL and the right eye ER of the user 700 are free of parallax. Operations of each of the above elements are disclosed below with an accompanying flowchart.

Figure 5:
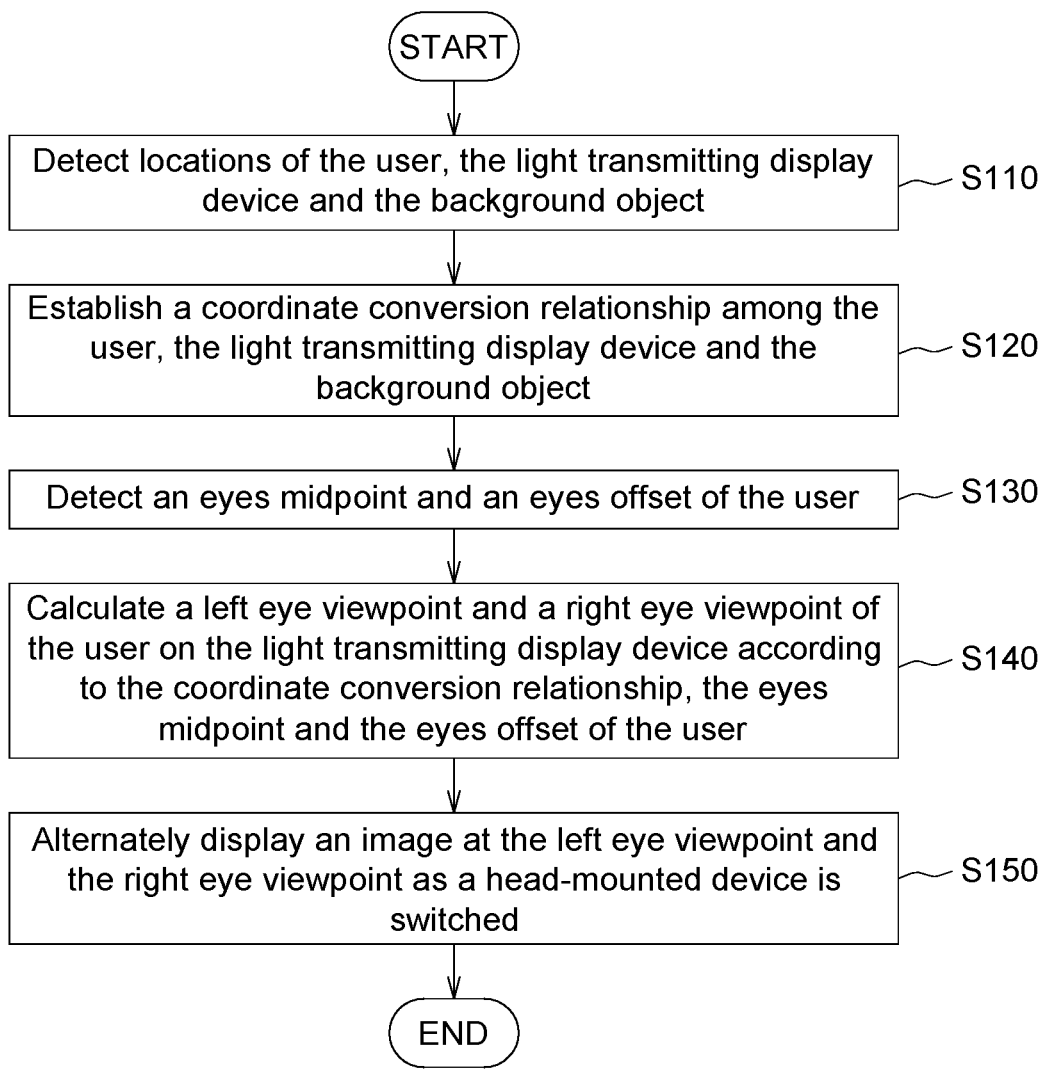
FIG. 5 is a flowchart of an image output method of the light transmitting display system according to an embodiment.

Referring to FIG. 5, a flowchart of an image output method of the light transmitting display system 1000 according to an embodiment is shown. Firstly, the method begins at step S110, the locations of the user 700, the light transmitting display device 100 and the background object 600 are detected by an image detection device 200. When the quantity of background objects 600 is pleural, the image detection device 200 can detect the location of the background object 600 gazed by the user 700 through the gaze direction of the user 700.

Figure 6:
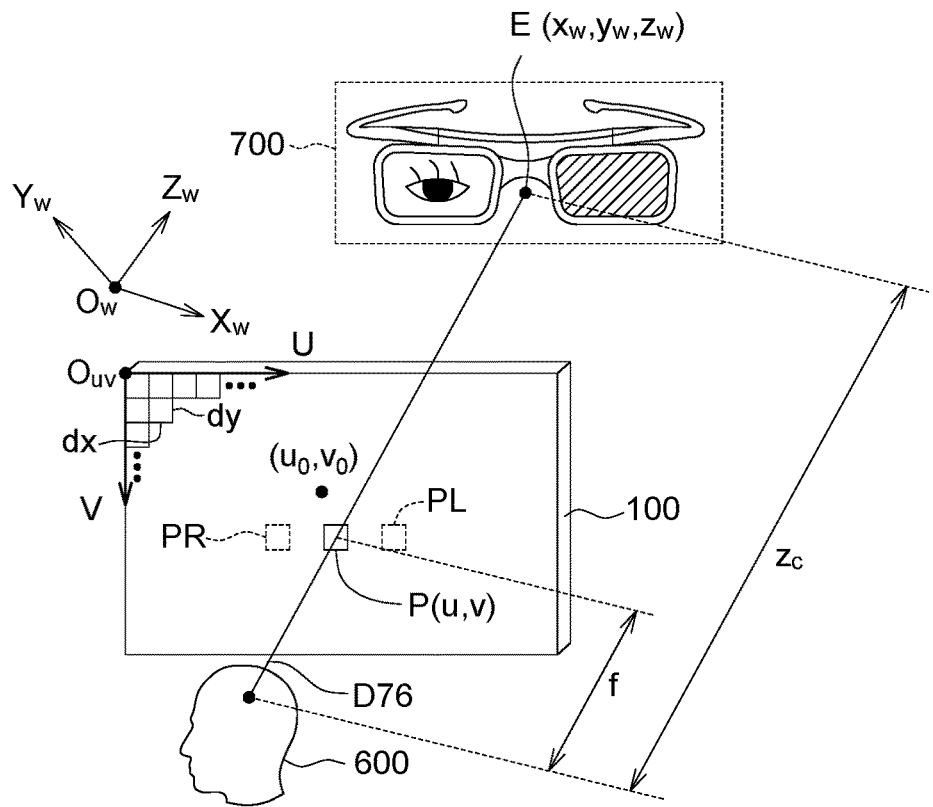
FIG. 6 illustrates a coordinate conversion relationship.

Then, the method proceeds to step S120, a coordinate conversion relationship CT between the user 700, the light transmitting display device 100 and the background object 600 is established by the coordinate conversion relationship establishment unit 410 of the processing device 400. Referring to FIG. 6, a coordinate conversion relationship CT is illustrated. In the present step, the eyes midpoint E of the global 3D coordinate system can be projected to the projection viewpoint P of the display plane 2D coordinate system of the light transmitting display device 100 along the direction D76 according to the coordinate conversion relationship CT. The global 3D coordinate system, which can be a real global 3D coordinate system in the unit of meters (m), has a predetermined origin point $O_w$ and three coordinate axes $X_w$, $Y_w$, $Z_w$. The display plane 2D coordinate system, which is formed by each pixel of the light transmitting display device 100, is in the unit of pixels and has an origin point $O_{uv}$ and two coordinate axes U and V at the top left corner. The eyes midpoint E can be projected to the projection viewpoint P according to the coordinate conversion relationship CT. With the use of the coordinate conversion relationship CT and the offset correction technology, the projection viewpoint P can be offset to the left eye viewpoint PL and the right eye viewpoint PR. Descriptions of the coordinate conversion relationship CT are disclosed below, and descriptions of the offset correction technology are disclosed in step S140.

The coordinate conversion relationship CT can be expressed as formula (1):

$$z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} x_w \\ y_w \\ z_w \\ 1 \end{bmatrix} \quad (1)$$

Figure 8A:
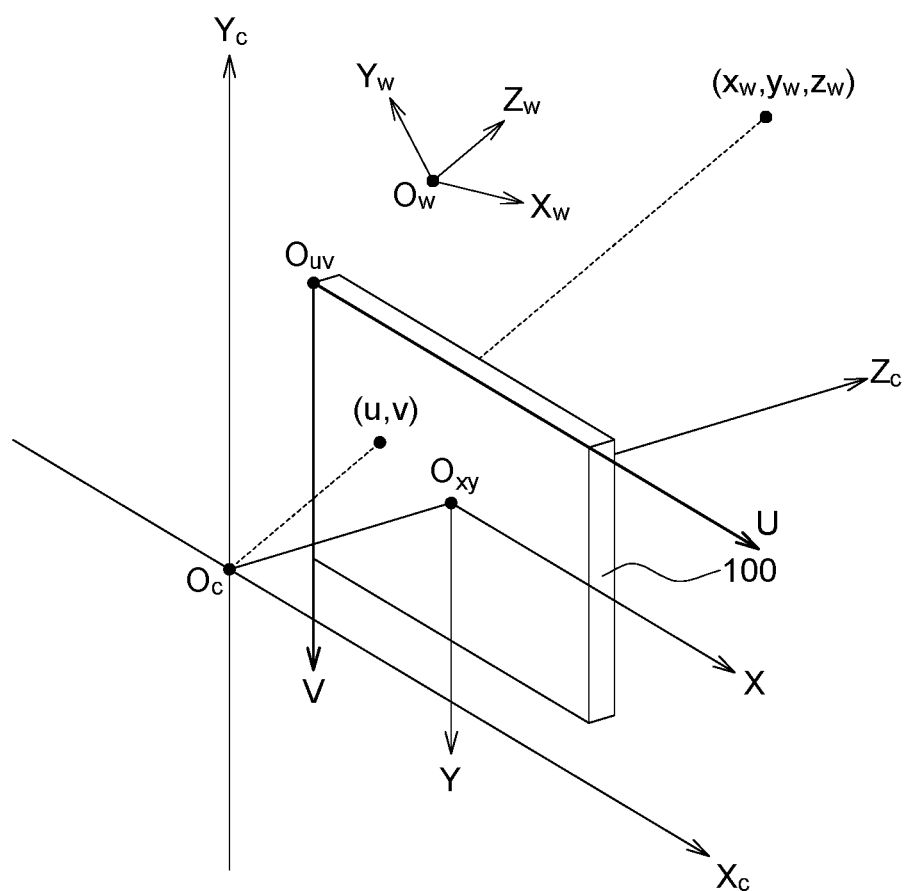
FIGS. 8A to 8E illustrate each step of FIG. 7.
Figure 8B:
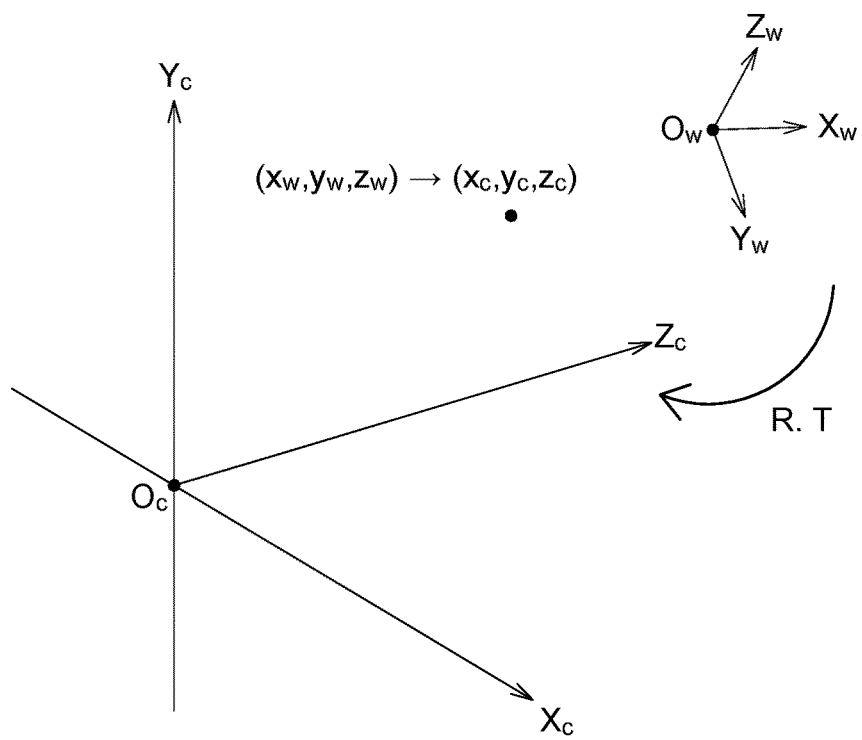

Wherein, in the global 3D coordinate system, the eyes midpoint E of has coordinates ($x_w$, $y_w$, $z_w$); in the display plane 2D coordinate system, the projection viewpoint P has coordinates (u, v), the user 700 and the background object 600 are separated by a distance $z_c$, the pixel of the light transmitting display device 100 has a width dx and a height dy. In the display plane 2D coordinate system, the center point of the light transmitting display device 100 has coordinates ($u_0$, $v_0$). The light transmitting display device 100 and the background object 600 are separated by a distance f. A rotation matrix R and an offset vector T are illustrated in FIG. 8B.

Figure 7:
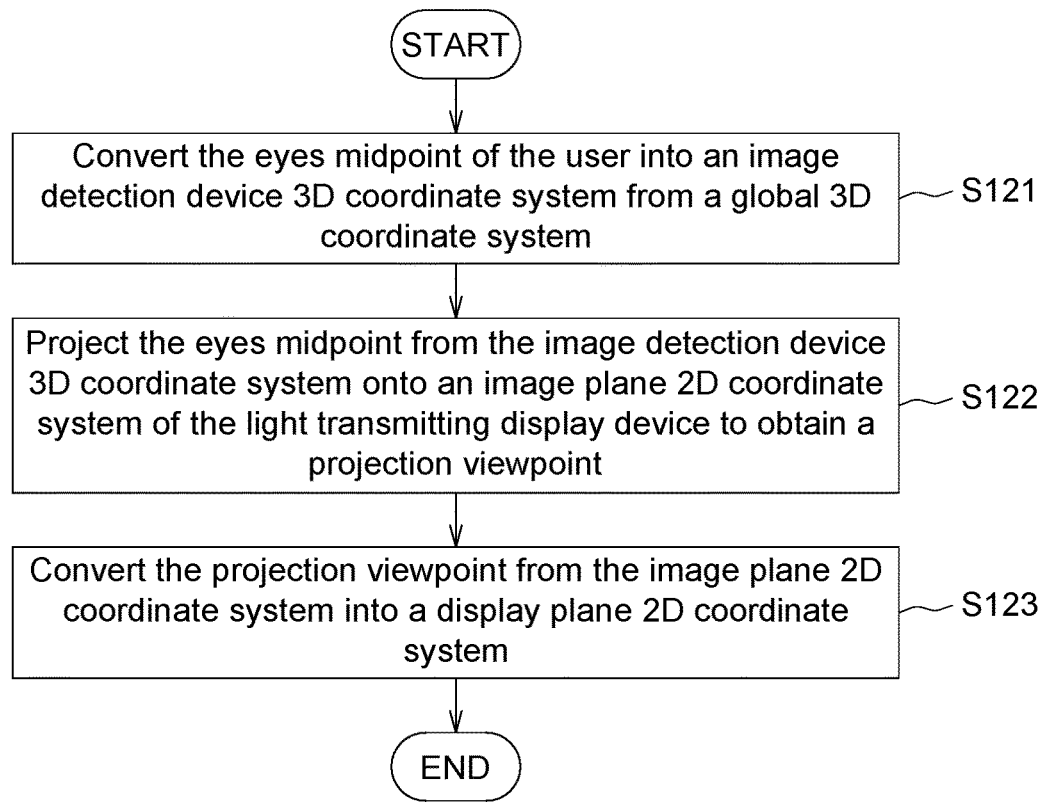
FIG. 7 is a detailed flowchart of step S120.

Operations of the coordinate conversion relationship CT are disclosed below with an accompanying flowchart. Refer to FIG. 7 and FIGS. 8A to 8E. FIG. 7 is a detailed flowchart of step S120. FIGS. 8A to 8E illustrate each step of FIG. 7. Referring to FIG. 8A and Table 1, the origin points and the coordinate axes of each coordinate system are listed.

TABLE 1

| | Origin point | Coordinate Axes | Unit |
|---|---|---|---|
| Global 3D coordinate system | $O_w$ (predetermined point) | $X_w, Y_w, Z_w$ | M |
| Image detection device 3D coordinate system | $O_c$ (background object 600) | $X_c, Y_c, Z_c$ | M |
| Image plane 2D coordinate system | $O_{xy}$ (the center point of the light transmitting display device 100) | X, Y | Mm |
| Display plane 2D coordinate system | $O_{uv}$ (the top left corner of the light transmitting display device 100) | U, V | Pixel |

Refer to FIG. 8B. In step S121, the eyes midpoint E of the user 700 is converted to the image detection device 3D coordinate system from the global 3D coordinate system. The origin point $O_c$ of the image detection device 3D coordinate system is at the background object 600. To convert the global 3D coordinates ($x_w$, $y_w$, $z_w$) to the image detection device 3D coordinates ($x_c$, $y_c$, $z_c$), the rotation matrix R and the offset vector T need to be rotated and translated respectively. Since the operations of rotation and translation are rigid transformation, the object will not be deformed.

Figure 8C:
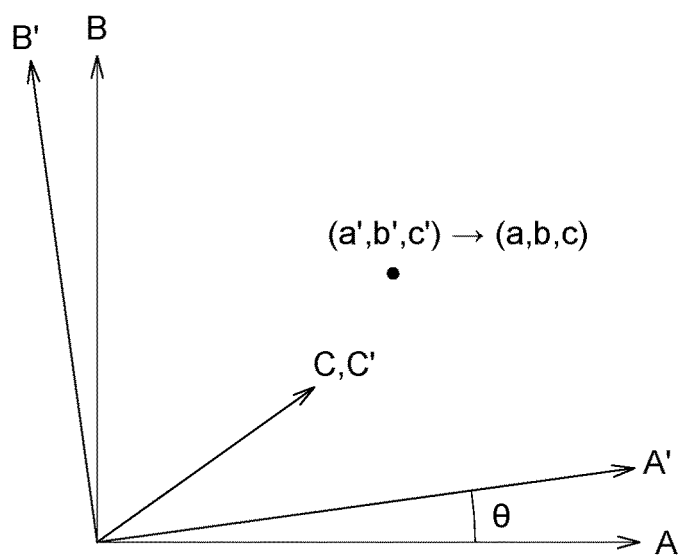

Refer to FIG. 8C. When a particular coordinate system is rotated around the coordinate axis C by $\theta°$, coordinates (a', b', c') are converted to coordinates (a, b, c) according to formula (2):

$$\begin{cases} a = a'\cos\theta - b'\sin\theta \\ b = a'\sin\theta + b'\cos\theta \\ c = c' \end{cases} \quad (2)$$

Formula (2) can be rearranged as formula (3):

$$\begin{bmatrix} a \\ b \\ c \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} a' \\ b' \\ c' \end{bmatrix} = R_1 \begin{bmatrix} a' \\ b' \\ c' \end{bmatrix} \quad (3)$$

Similarly, when a particular coordinate system is rotated around the coordinate axis A by $\emptyset°$, coordinates (a', b', c') are converted to coordinates (a, b, c) according to formula (4):

$$\begin{bmatrix} a \\ b \\ c \end{bmatrix} = \begin{bmatrix} 1 & 0 & 0 \\ 0 & \cos\emptyset & \sin\emptyset \\ 0 & -\sin\emptyset & \cos\emptyset \end{bmatrix} \begin{bmatrix} a' \\ b' \\ c' \end{bmatrix} = R_2 \begin{bmatrix} a' \\ b' \\ c' \end{bmatrix} \quad (4)$$

Similarly, when a particular coordinate system is rotated around the coordinate axis B by $\varphi°$, coordinates (a', b', c') are converted to coordinates (a, b, c) according to formula (5):

$$\begin{bmatrix} a \\ b \\ c \end{bmatrix} = \begin{bmatrix} \cos\varphi & 0 & -\sin\varphi \\ 0 & 1 & 0 \\ \sin\varphi & 0 & \cos\varphi \end{bmatrix} \begin{bmatrix} a' \\ b' \\ c' \end{bmatrix} = R_3 \begin{bmatrix} a' \\ b' \\ c' \end{bmatrix} \quad (5)$$

Therefore, if a particular coordinate system is rotated around the coordinate axis C by $\theta°$, around the coordinate axis A by $\emptyset°$, and around the coordinate axis B by $\varphi°$, then coordinates (a', b', c') are converted to coordinates (a, b, c) according to formula (6):

$$\begin{bmatrix} a \\ b \\ c \end{bmatrix} = R_1 R_2 R_3 \begin{bmatrix} a' \\ b' \\ c' \end{bmatrix} = R \begin{bmatrix} a' \\ b' \\ c' \end{bmatrix} \quad (6)$$

When the global 3D coordinate system is converted to the image detection device 3D coordinate system, the global 3D coordinate system not only can be rotated around the three coordinate axes, the coordinates $z_0$, $x_0$ and $y_0$ can further be translated along the coordinate axes $Z_w$, $X_w$ and $Y_w$ respectively. Therefore, the coordinates ($x_w$, $y_w$, $z_w$) of the global 3D coordinate system can be converted to the coordinates ($x_c$, $y_c$, $z_c$) of the image detection device 3D coordinate system according to formula (7):

$$\begin{bmatrix} x_c \\ y_c \\ z_c \end{bmatrix} = R \begin{bmatrix} x_w \\ y_w \\ z_w \end{bmatrix} + \begin{bmatrix} x_0 \\ y_0 \\ z_0 \end{bmatrix} = R \begin{bmatrix} x_w \\ y_w \\ z_w \end{bmatrix} + T \quad (7)$$

Formula (7) can further be re-arranged as formula (8):

$$\begin{bmatrix} x_c \\ y_c \\ z_c \\ 1 \end{bmatrix} = \begin{bmatrix} R & T \\ 0 & 1 \end{bmatrix} \begin{bmatrix} x_w \\ y_w \\ z_w \\ 1 \end{bmatrix} \quad (8)$$

Wherein, the rotation matrix R is a 3×3 matrix, the offset vector T is a 3×1 matrix, and $$\begin{bmatrix} R & T \\ 0 & 1 \end{bmatrix}$$

is a 4×4 matrix. The global 3D coordinates ($x_w$, $y_w$, $z_w$) can be converted to the image detection device 3D coordinates ($x_c$, $y_c$, $z_c$) according to formula (8).

Figure 8D:
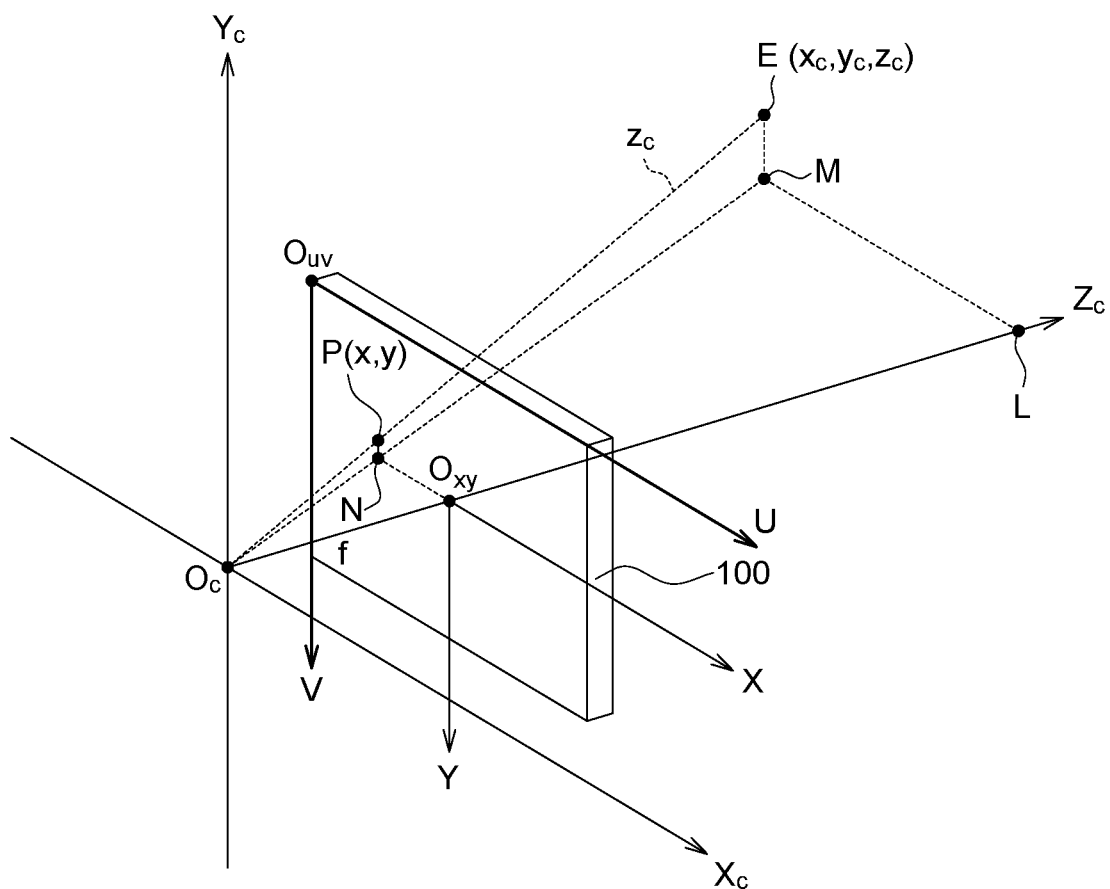

Refer to FIG. 8D. In step S122, the eyes midpoint E is projected to the image plane 2D coordinate system of the light transmitting display device 100 from the image detection device 3D coordinate system to obtain the projection viewpoint P. Now, the eyes midpoint E is already converted to the image detection device 3D coordinate system. In the image detection device 3D coordinate system, the projection viewpoint P has coordinates ($x_c$, $y_c$, $z_c$). As indicated in FIG. 8D, the image detection device 3D coordinate system has origin point $O_c$, and the projection viewpoint P is obtained in the light transmitting display device 100 along the eyes midpoint E and the origin point $O_c$. The image plane 2D coordinate system has an origin point $O_{xy}$, which is the center point of the light transmitting display device 100. The origin point $O_c$, the origin point $O_{xy}$, the projection viewpoint P, the point L, the point M, and the point N illustrated in FIG. 8D satisfy the geometric relation expressed as formula (9):

$$\begin{cases} \triangle LMO_c \cong \triangle O_{xy}NO_c \\ \triangle EMO_c \cong \triangle PNO_c \end{cases} \quad (9)$$

The relation between the sides as expressed in formula (10) can be obtained from formula (9).

$$\frac{\overline{LM}}{\overline{O_{xy}N}} = \frac{\overline{LO_c}}{\overline{O_{xy}O_c}} = \frac{\overline{EM}}{\overline{PN}} = \frac{x_c}{x} = \frac{y_c}{y} = \frac{z_c}{z} \quad (10)$$

Formula (11) can be obtained from formula (10).

$$\begin{cases} x = f * \dfrac{x_c}{z_c} \\ y = f * \dfrac{y_c}{z_c} \end{cases} \quad (11)$$

Wherein the origin point $O_c$ and the origin point $O_{xy}$ are separated by a distance f, which is the distance between the light transmitting display device 100 and the background object 600.

Formula (11) can further be re-arranged as formula (12):

$$z_c \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} x_c \\ y_c \\ z_c \\ 1 \end{bmatrix} \quad (12)$$

The image detection device 3D coordinates ($x_c$, $y_c$, $z_c$) can be projected as the image plane 2D coordinates (x, y) of the projection viewpoint P according to formula (12).

Figure 8E:
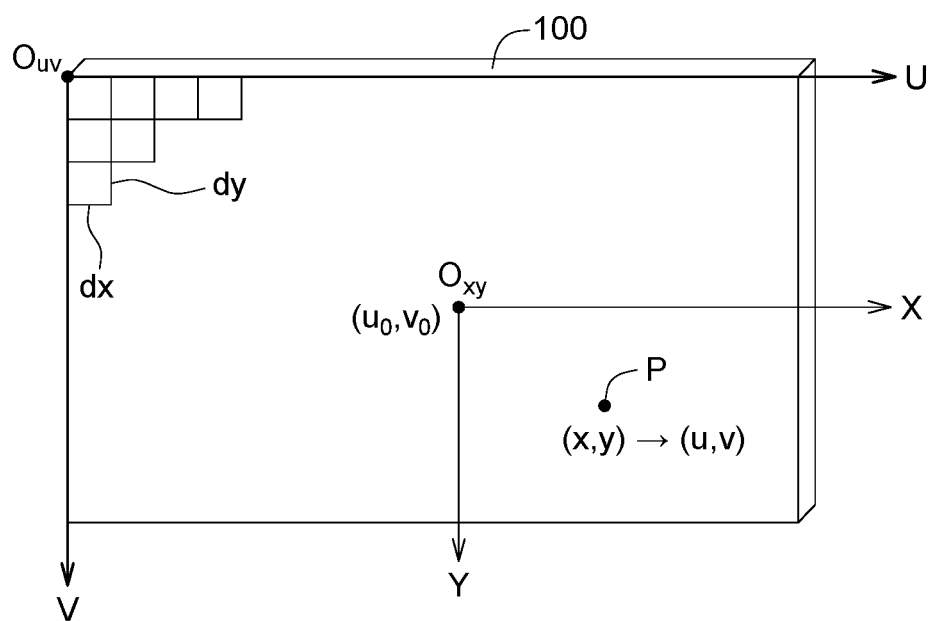

Refer to FIG. 8E. In step S123, the projection viewpoint P is converted to the display plane 2D coordinate system from the image plane 2D coordinate system. The image plane 2D coordinate system has an origin point $O_{xy}$, which is the center point of the light transmitting display device 100. The display plane 2D coordinate system has an origin point $O_{uv}$, which is the top left corner of the light transmitting display device 100. In the display plane 2D coordinate system, the center point of the light transmitting display device 100 has coordinates ($u_0$, $v_0$), and each pixel has a width dx and a height dy. The image plane 2D coordinates (x, y) of the projection viewpoint P can be converted to the display plane 2D coordinates (u, v) according to formula (13):

$$\begin{cases} u = \dfrac{x}{dx} + u_0 \\ v = \dfrac{y}{dy} + v_0 \end{cases} \quad (13)$$

Formula (13) can further be converted to formula (14):

$$\begin{bmatrix} u \\ v \\ 1 \end{bmatrix} = \begin{bmatrix} \dfrac{1}{dx} & 0 & u_0 \\ 0 & \dfrac{1}{dy} & v_0 \\ 0 & 0 & 1 \end{bmatrix} \begin{bmatrix} x \\ y \\ 1 \end{bmatrix} \quad (14)$$

The formulas (8), (12), and (14) of steps S121 to S123 can be combined as formula (15), which is the coordinate conversion relationship CT expressed in formula (1).

$$z_c \begin{bmatrix} u \\ v \\ 1 \end{bmatrix} = \begin{bmatrix} \dfrac{1}{dx} & 0 & u_0 \\ 0 & \dfrac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} x_w \\ y_w \\ z_w \\ 1 \end{bmatrix} \quad (15)$$

After the coordinate conversion relationship CT is obtained, the method proceeds to step S130 of FIG. 5.

Figure 9:
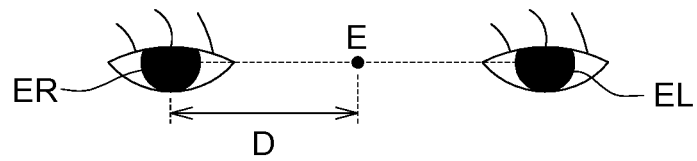
FIG. 9 illustrates steps S130 and S140.
Figure 9:
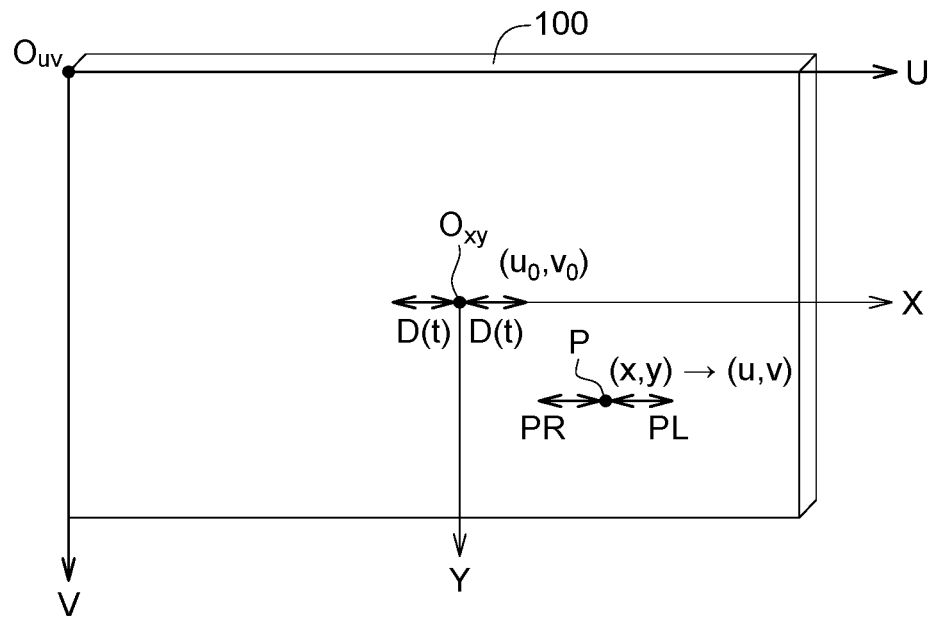

In step S130, the eyes midpoint E and the eyes offset D of the user 700 are detected by the image detection device 200. If the user 700 is another user, the eyes midpoint E and the different eyes offset D of the another user will be different from that of the original user and therefore need to be detected during the operation. Refer to steps S130 and S140 of FIG. 9. As indicated in FIG. 9, the eyes offset D is a half of the interval between the two eyes, that is, the distance from the eyes midpoint E to the left eye EL or to the right eye ER.

In step S140, the left eye viewpoint PL and the right eye viewpoint PR of the user 700 on the light transmitting display device 100 are calculated by the viewpoint calculation unit 420 of the processing device 400 according to the coordinate conversion relationship CT, the eyes midpoint E and the eyes offset D of the user. The projection viewpoint P can be obtained by substituting the eyes midpoint E into the coordinate conversion relationship CT. To match the sight of the left eye EL of the user 700, the projection viewpoint P is offset to the left eye viewpoint PL. To match the sight of the right eye ER of the user 700, the projection viewpoint P is offset to the right eye viewpoint PR. In the present step, the center point of the light transmitting display device 100 is offset to the right by an offset D(t), that is, the projection viewpoint P obtained through calculation is offset to the left eye viewpoint PL, and the center point of the light transmitting display device 100 is offset to the left by an offset D(t), and the projection viewpoint P is obtained through calculation is offset to the right eye viewpoint PR. The offset D(t) can be expressed as formula (16):

$$D(t) = D \sum_{k=1}^{\infty} \frac{\sin((2k-1)2\pi ht)}{(2k-1)} \quad (16)$$

Wherein, h represents a display frequency of the light transmitting display device 100; t represents time; and offset D(t) is a function of time.

That is, after incorporating offset correction, formula (15) can be rearranged as formula (17):

$$z_c \begin{bmatrix} u \\ v \\ 1 \end{bmatrix} = \begin{bmatrix} \frac{1}{dx} & 0 & u_0 + D(t) \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} x_w \\ y_w \\ z_w \\ 1 \end{bmatrix} \quad (17)$$

The left eye viewpoint PL and the right eye viewpoint PR, which switch over time, can be calculated according to formula (17).

Then, the method proceeds to step S150, as the head-mounted device 300 is switched, the image P11 is alternately displayed at the left eye viewpoint PL and the right eye viewpoint PR by the image control unit 430 of the processing device 400. In the present step, the alternating frequency of the left eye viewpoint PL and the right eye viewpoint PR can be identical to the switching frequency of the head-mounted device 300. Thus, when viewing the light transmitting display device 100, the left eye EL and the right eye ER of the user 700 are free of parallax. In an embodiment, in the step of alternately displaying the image P11 at the left eye viewpoint PL and the right eye viewpoint PR, the alternating frequency of the left eye viewpoint PL and the right eye viewpoint PR is related to the display frequency of the light transmitting display device 100.

Figure 10:
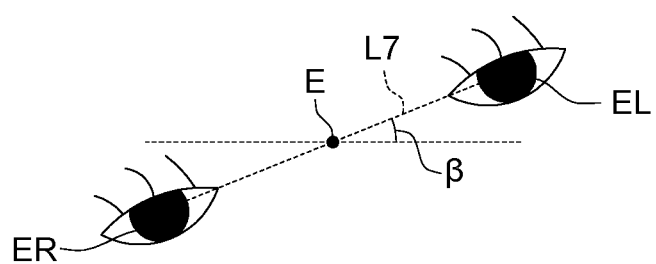
FIG. 10 is a schematic diagram of a left eye and a right eye of a user according to another embodiment.

Referring to FIG. 10, a schematic diagram of a left eye EL and a right eye ER of a user 700 according to another embodiment is shown. In the embodiment as indicated in FIG. 10, a binocular connection line L7 of the user 700 may have a binocular connection line tile angle β. Meanwhile, formula (17) can be modified as formula (18), which calculates the left eye viewpoint PL and the right eye viewpoint PR more correctly.

$$z_c \begin{bmatrix} u \\ v \\ 1 \end{bmatrix} = \begin{bmatrix} \frac{1}{dx} & 0 & u_0 + D(t)\cos\beta \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} x_w \\ y_w \\ z_w \\ 1 \end{bmatrix} \quad (18)$$

Figure 11:
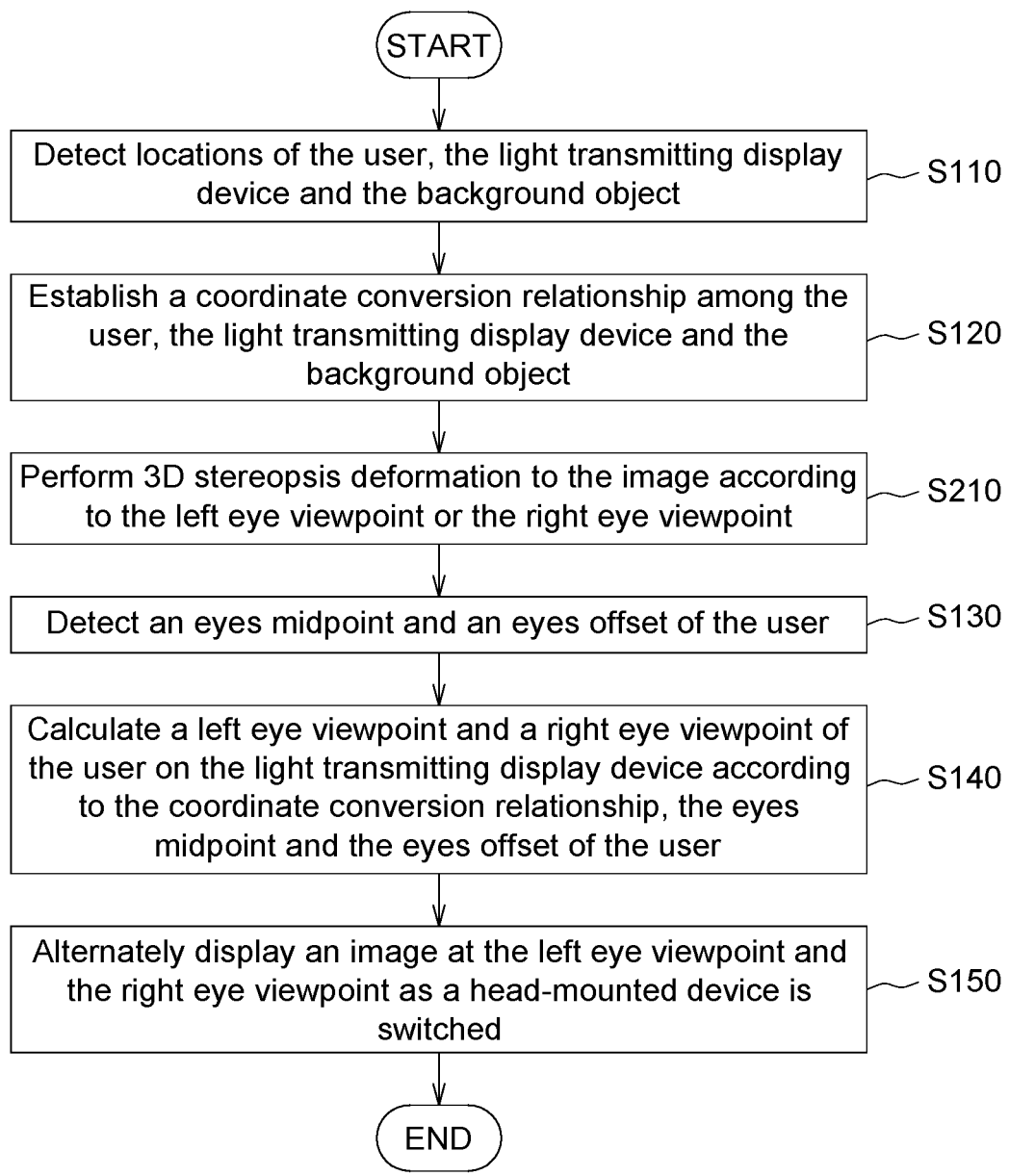
FIG. 11 is a flowchart of an image output method according to another embodiment.
Figure 12:
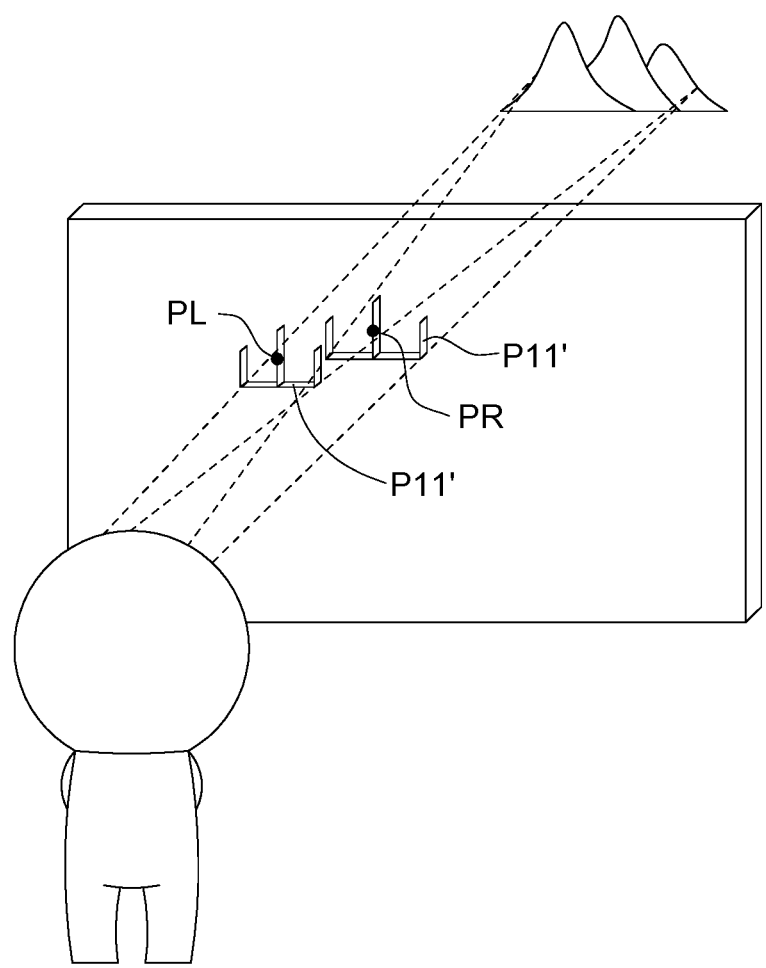
FIG. 12 illustrates an image of FIG. 11.

Referring to FIG. 11 and FIG. 12. FIG. 11 is a flowchart of an image output method according to another embodiment. FIG. 12 illustrates an image P11' of FIG. 11. In the present embodiment, the image output method further includes step S210. In step S210, 3D stereopsis deformation can be performed to the image P11' by the image control unit 430 according to the left eye viewpoint PL or the right eye viewpoint PR. During the 3D stereopsis deformation, the display angle of the image P11' is determined according to the angle formed by the line connecting the human eyes and the background object and the light transmitting display device 100. As the display angle changes, the position of the background object in the image P11' also changes, and the user will have a feeling of stereopsis.

Figure 13:
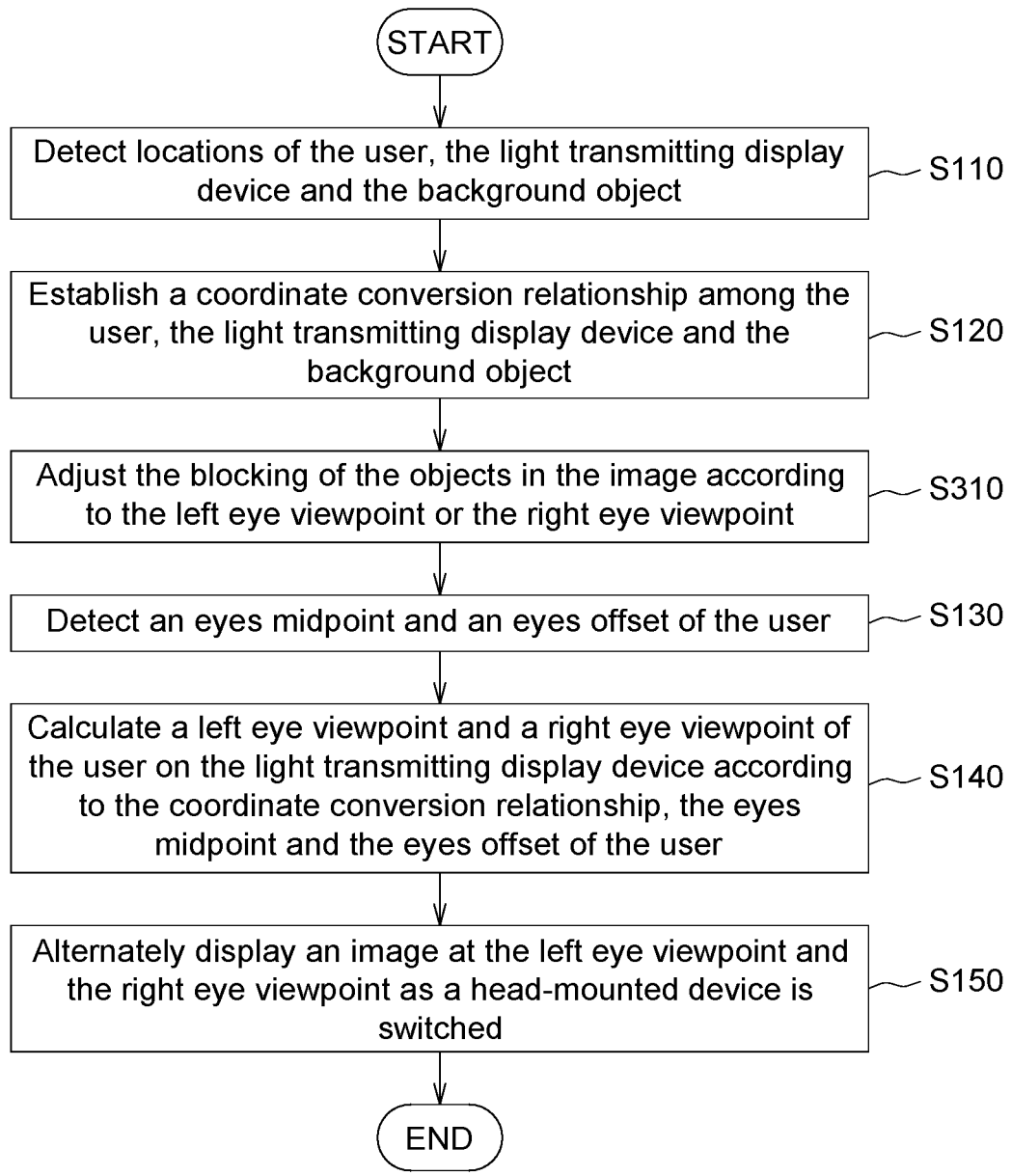
FIG. 13 is a flowchart of an image output method according to another embodiment.
Figure 14:
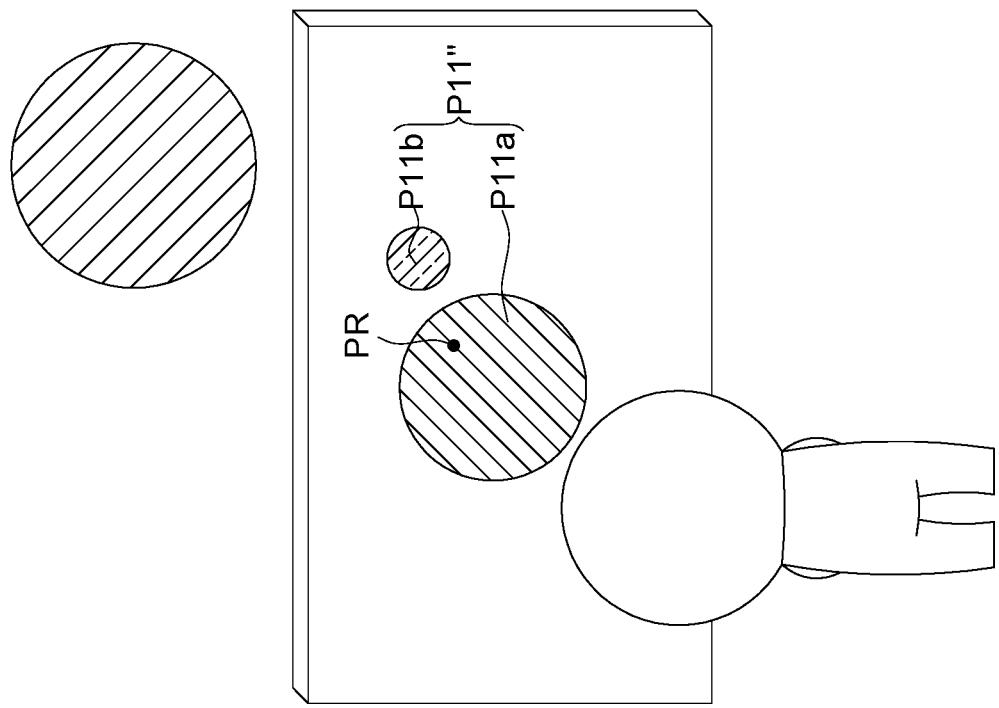
FIG. 14 illustrates an image of FIG. 13.
Figure 14:
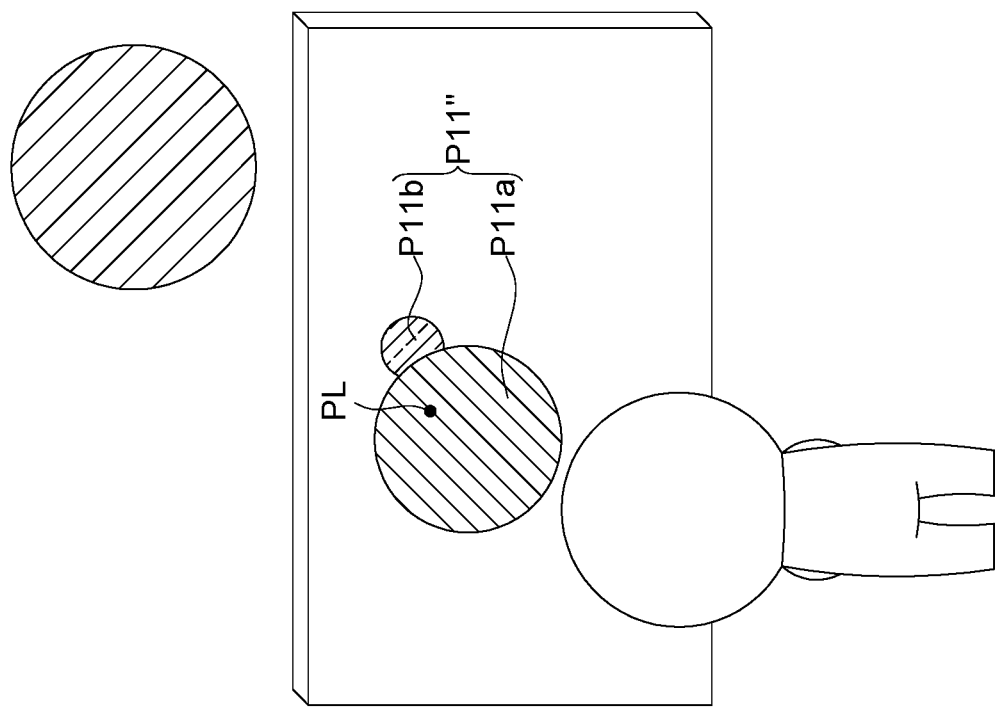

Refer to FIG. 13 and FIG. 14. FIG. 13 is a flowchart of an image output method according to another embodiment. FIG. 14 illustrates an image P11" of FIG. 13. In the present embodiment, the image output method further includes step S310. In step S310, the blocking of the object P11a and the object P11b in the image P11" is adjusted by the image control unit 430 according to the left eye viewpoint or the right eye viewpoint to provide the image P11" with a stereopsis vision. For example, due to the difference in the viewing angle between the left eye and the right eye, it is possible that the right eye may view two objects, one in the front and the other in the rear, but the left eye may only view the front object and cannot view the rear object which is blocked by the front object. The blocking of the left eye and the right eye can be adjusted to provide the image P11" with stereopsis vision.

According to the above embodiments, with respect to the sight of the left eye EL, the images P11, P11' and P11" can be displayed at the left eye viewpoint PL, such that the image P11, P11' and P11" viewed by the left eye EL of the user 700 can be aligned with the background object 600. With respect to the sight of the right eye ER, the images P11, P11' and P11" can be displayed at the right eye viewpoint PR, such that the images P11, P11' and P11" viewed by the right eye ER of the user 700 can be aligned with the background object 600. As the head-mounted device 300 is switched, the processing device 400 can control the light transmitting display device 100 to display the image P11, P11' and P11" at the left eye viewpoint PL and the right eye viewpoint PR alternately. Thus, when viewing the light transmitting display device 100, the left eye EL and the right eye ER of the user 700 are free of parallax.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image output method of a light transmitting display system, wherein a light transmitting display device is located between a background object and a user, and the image output method comprises:

detecting locations of the user, the light transmitting display device and the background object;

establishing a coordinate conversion relationship among the user, the light transmitting display device and the background object;

detecting an eyes midpoint and an eyes offset of the user;

calculating a left eye viewpoint and a right eye viewpoint of the user on the light transmitting display device according to the coordinate conversion relationship, the eyes midpoint of the user and the eyes offset of the user; and alternately displaying an image at the left eye viewpoint and the right eye viewpoint as a head-mounted device is switched.

2. The image output method of the light transmitting display system according to claim 1, wherein in the step of detecting the locations of the user, the light transmitting display device and the background object, the location of the background object is detected through a gaze direction of the user.

3. The image output method of the light transmitting display system according to claim 1, wherein the step of establishing the coordinate conversion relationship among the user, the light transmitting display device and the background object comprises: converting the eyes midpoint of the user into an image detection device 3D coordinate system from a global 3D coordinate system, wherein origin point of the image detection device 3D coordinate system is at the background object;

projecting the eyes midpoint from the image detection device coordinate system onto an image plane 2D coordinate system of the light transmitting display device to obtain a projection viewpoint; and converting the projection viewpoint from the image plane 2D coordinate system into a display plane 2D coordinate system.

4. The image output method of the light transmitting display system according to claim 1, wherein in the step of calculating the left eye viewpoint and the right eye viewpoint of the user on the light transmitting display device according to the coordinate conversion relationship and the eyes offset, the left eye viewpoint and the right eye viewpoint of the user on the light transmitting display device are further calculated according to a binocular connection line tilt angle of the user.

5. The image output method of the light transmitting display system according to claim 1, wherein in the step of alternately displaying the image at the left eye viewpoint and the right eye viewpoint, an alternating frequency of the left eye viewpoint and the right eye viewpoint is identical to a switching frequency of the head-mounted device.

6. The image output method of the light transmitting display system according to claim 1, wherein in the step of alternately displaying the image at the left eye viewpoint and the right eye viewpoint, an alternating frequency of the left eye viewpoint and the right eye viewpoint is related to a display frequency of the light transmitting display device.

7. The image output method of the light transmitting display system according to claim 1, wherein in the step of establishing the coordinate conversion relationship among the user, the light transmitting display device and the background object, the coordinate conversion relationship is related to a distance between the light transmitting display device and the background object or is related to a distance between the user and the background object.

8. A light transmitting display system, comprising:

a light transmitting display device located between a background object and a user;

an image detection device configured to detect locations of the user, the light transmitting display device and the background object, an eyes midpoint of the user and an eyes offset of the user;

a head-mounted device; and a processing device, comprising:

a coordinate conversion relationship establishment unit configured to establish a coordinate conversion relationship among the user, the light transmitting display device and the background object;

a viewpoint calculation unit configured to calculate a left eye viewpoint and a right eye viewpoint of the user on the light transmitting display device according to the coordinate conversion relationship, the eyes midpoint and the eyes offset; and an image control unit configured to control the light transmitting display device to alternately display an image at the left eye viewpoint and the right eye viewpoint as the head-mounted device is switched.

9. The light transmitting display system according to claim 8, wherein the image detection device detects the location of the background object through a gaze direction of the user.

10. The light transmitting display system according to claim 8, wherein the coordinate conversion relationship establishment unit converts the eyes midpoint of the user into an image detection device 3D coordinate system from a global 3D coordinate system, and origin point of the image detection device 3D coordinate system is at the background object; the coordinate conversion relationship establishment unit further projects the eyes midpoint onto an image plane 2D coordinate system of the light transmitting display device from the image detection device coordinate system to obtain a projection viewpoint; and the coordinate conversion relationship establishment unit further converts the projection viewpoint into a display plane 2D coordinate system from the image plane 2D coordinate system.

11. The light transmitting display system according to claim 8, wherein the viewpoint calculation unit further calculates the left eye viewpoint and the right eye viewpoint of the user on the light transmitting display device according to a binocular connection line tilt angle of the user.

12. The light transmitting display system according to claim 8, wherein an alternating frequency of the left eye viewpoint and the right eye viewpoint is identical to a switching frequency of the head-mounted device, or an alternating frequency of the left eye viewpoint and the right eye viewpoint is related to a display frequency of the light transmitting display device.

13. The light transmitting display system according to claim 12, wherein the coordinate conversion relationship is related to a distance between the light transmitting display device and the background object or is related to a distance between the user and the background object.

14. A processing device configured to control a light transmitting display system, wherein the light transmitting display system comprises a light transmitting display device, an image detection device and a head-mounted device and is located between a background object and a user; the image detection device is configured to detect locations of the user, the light transmitting display device and the background object, an eyes midpoint of the user and an eyes offset of the user; and the processing device comprises:

a coordinate conversion relationship establishment unit configured to establish a coordinate conversion relationship among the user, the light transmitting display device and the background object;

a viewpoint calculation unit configured to calculate a left eye viewpoint and a right eye viewpoint of the user on the light transmitting display device according to the coordinate conversion relationship, the eyes midpoint and the eyes offset; and an image control unit configured to control the light transmitting display device to alternately display an image at the left eye viewpoint and the right eye viewpoint as the head-mounted device is switched.

15. The processing device according to claim 14, wherein the image detection device detects the location of the background object through a gaze direction of the user.

16. The processing device according to claim 14, wherein the coordinate conversion relationship establishment unit converts the eyes midpoint of the user into an image detection device 3D coordinate system from a global 3D coordinate system, and origin point of the image detection device 3D coordinate system is at the background object; the coordinate conversion relationship establishment unit further projects the eyes midpoint from the image detection device coordinate system onto an image plane 2D coordinate system of the light transmitting display device to obtain a projection viewpoint; and the coordinate conversion relationship establishment unit further converts the projection viewpoint into a display plane 2D coordinate system from the image plane 2D coordinate system.

17. The processing device according to claim 14, wherein the viewpoint calculation unit further calculates the left eye viewpoint and the right eye viewpoint of the user on the light transmitting display device according to a binocular connection line tilt angle of the user.

18. The processing device according to claim 14, wherein an alternating frequency of the left eye viewpoint and the right eye viewpoint is identical to a switching frequency of the head-mounted device.

19. The processing device according to claim 14, wherein an alternating frequency of the left eye viewpoint and the right eye viewpoint is related to a display frequency of the light transmitting display device.

20. The processing device according to claim 14, wherein the coordinate conversion relationship is related to a distance between the light transmitting display device and the background object or is related to a distance between the user and the background object.

* * * * *